United States Patent [19]

Ridgway

[11] Patent Number: 4,763,743

[45] Date of Patent: Aug. 16, 1988

[54] IMPLEMENT HITCH

[75] Inventor: David M. Ridgway, West Des Moines, Iowa

[73] Assignee: Iowa State University Research Foundation, Inc., Ames, Iowa

[21] Appl. No.: 56,151

[22] Filed: Jun. 1, 1987

[51] Int. Cl.$^4$ .............................................. B60K 25/00
[52] U.S. Cl. ................................... 180/53.3; 280/420; 280/421; 280/492
[58] Field of Search .................... 180/14.4, 14.1, 53.3; 280/421, 420, 492, 489

[56] References Cited

U.S. PATENT DOCUMENTS

| | | | |
|---|---|---|---|
| 1,967,326 | 7/1934 | Raney et al. | 280/492 X |
| 2,852,273 | 9/1958 | Hudson | 280/420 |
| 3,091,352 | 5/1963 | Vitable | 280/477 X |
| 3,336,996 | 8/1967 | Hautzenroeder | 180/14.1 |
| 3,428,334 | 2/1969 | Hils | 280/421 |
| 3,871,463 | 3/1975 | Geisthoff | 280/14.4 |
| 3,934,667 | 1/1976 | Schwartz et al. | 180/14.4 |
| 4,368,899 | 1/1983 | Smalley et al. | 280/477 |

FOREIGN PATENT DOCUMENTS

| | | | |
|---|---|---|---|
| 1052143 | 3/1959 | Fed. Rep. of Germany | 280/421 |
| 1198212 | 8/1965 | Fed. Rep. of Germany | 180/14.4 |

*Primary Examiner*—John A. Pekar
*Attorney, Agent, or Firm*—Zarley McKee, Thomte, Voorhees & Sease

[57] ABSTRACT

A hitch device for connecting an implement to a tractor is provided. A male plug is operatively connected to the three point hitch, power take-off and hydraulic system of the tractor. A female shell is operatively connected to the tongue, drive train and hydraulic system of the implement. The male plug and female shell can be connected and disconnected while the operator remains seated on the tractor. The mating engagement of the male plug within the female shell automatically connects the drive train of the implement to the power take-off of the tractor and automatically connects the hydraulic system of the implement to the hydraulic system of the tractor. Releasable locking clips are provided to lock the male plug within the female shell.

26 Claims, 3 Drawing Sheets

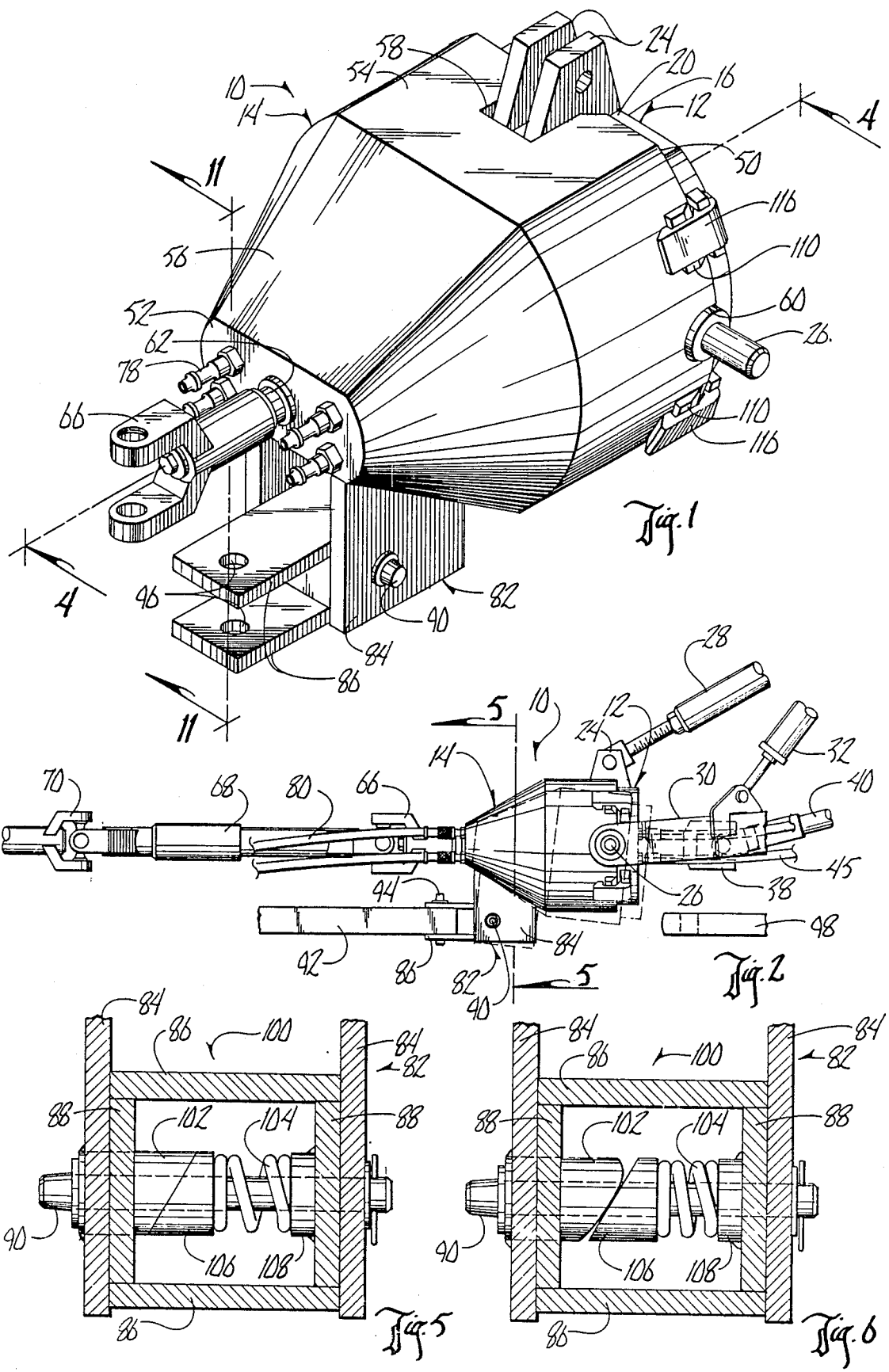

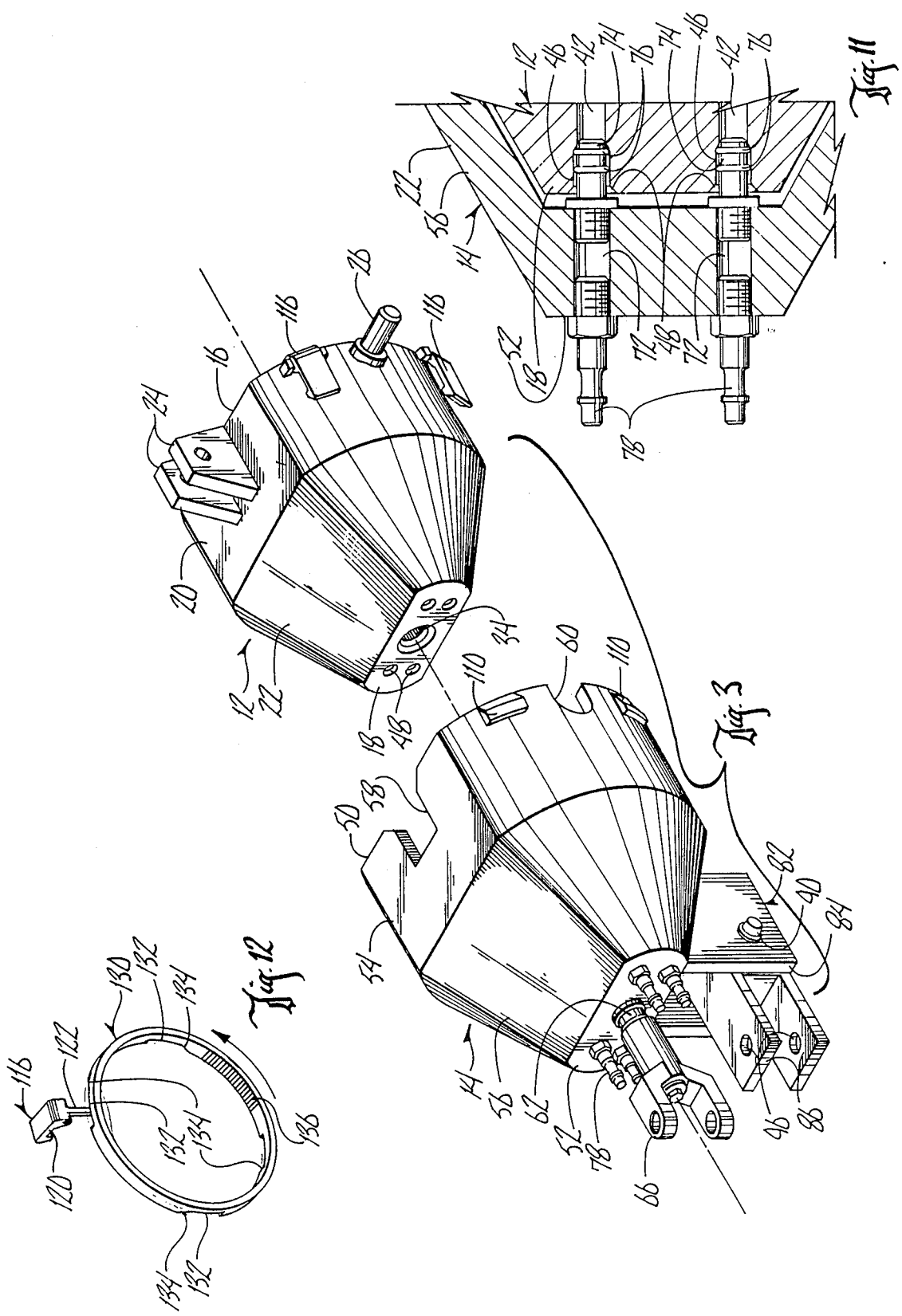

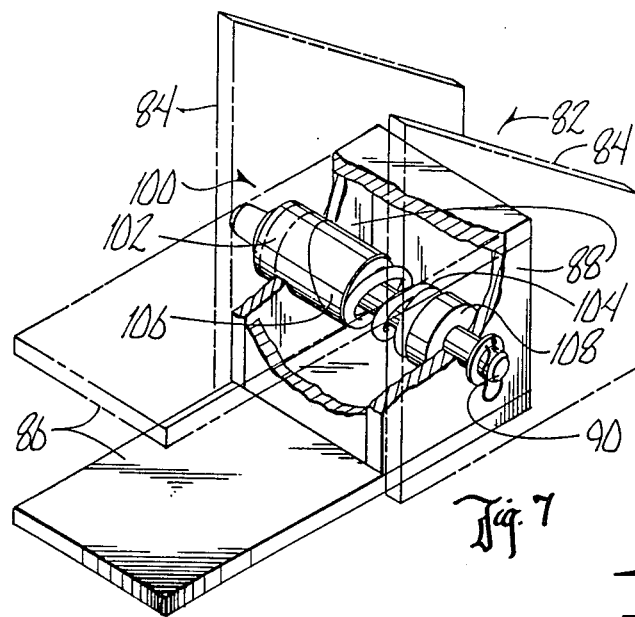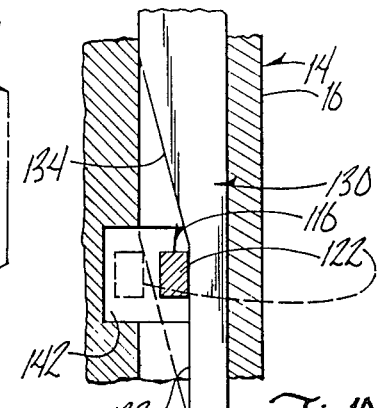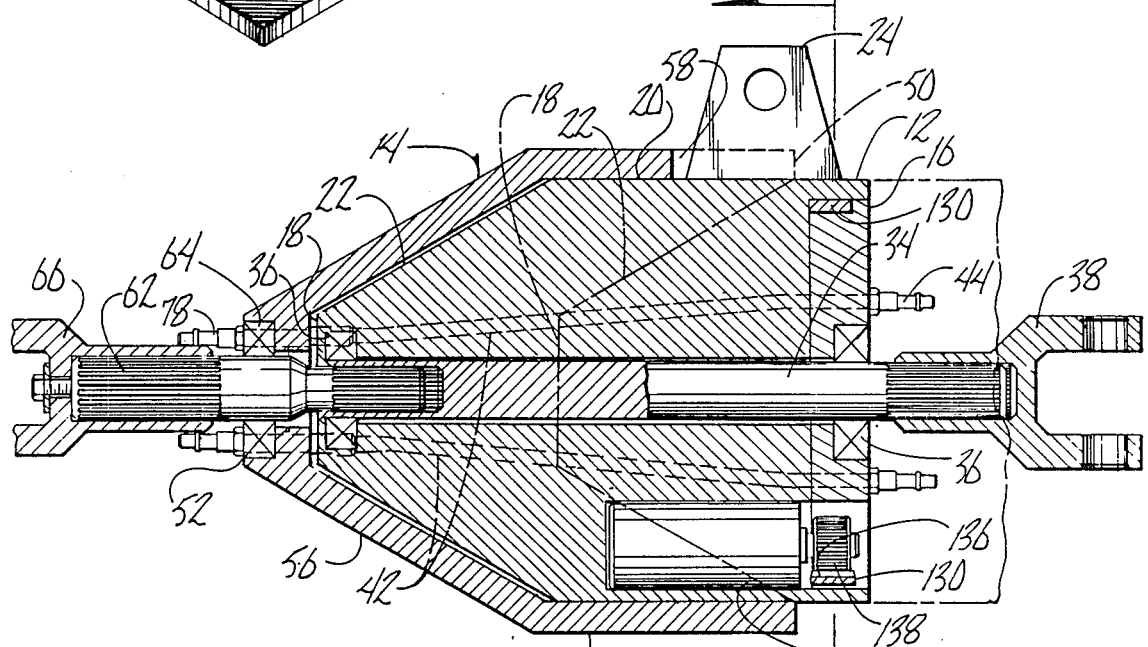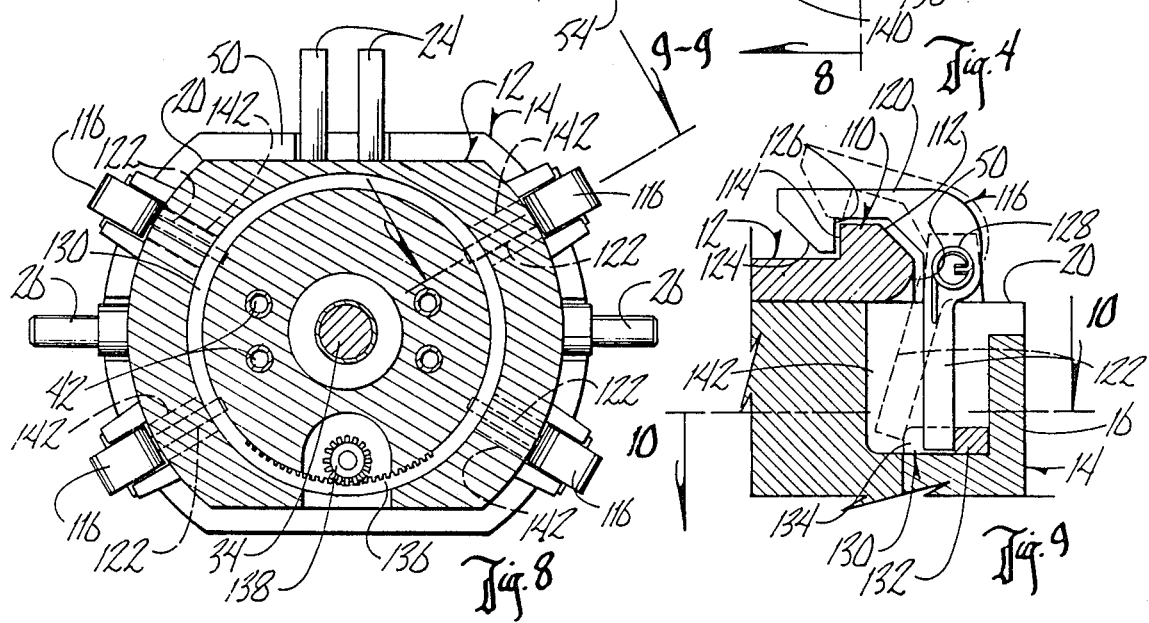

IMPLEMENT HITCH

BACKGROUND OF THE INVENTION

It is common in farming to pull an implement behind a tractor with the drive train of the implement being connected to the power take-off of the tractor and the hydraulic system of the implement being connected to the hydraulic system of the tractor. Conventional hitches for connecting such implements to the tractor normally provide a structural connection for towing the implement and then require additional connections for connecting the drive train of the implement to the power take-off of the tractor and for connecting the hydraulic system of the implement to the hydraulic system of the tractor. In conventional hitches, these extra connections for the drive train and hydraulic system of the implement cannot be made by the operator while seated on the tractor. Therefore, valuable time is required for making such connections.

Accordingly, it is a primary objective of the present invention to provide an improved hitch for connecting an implement to a tractor.

Another objective of the present invention is the provision of an improved hitch which automatically connects the drive train of the implement to the power take-off of the tractor.

Still a further objective of the present invention is the provision of an improved hitch which automatically connects the hydraulic system of the implement to the hydraulic system of the tractor.

Another objective of the present invention is the provision of an improved hitch for connecting an implement to a tractor and for connecting the drive train and hydraulic system of the implement to the power take-off and hydraulic system of the tractor, respectively, while the operator remains seated on the tractor.

A further objective of the present invention is the provision of an improved hitch for quickly, easily and safely connecting an implement to a tractor.

Still another objective of the present invention is the provision of an improved hitch which is economical to manufacture and durable in use.

These and other objectives will become apparent from the following description of the invention.

BRIEF DESCRIPTION OF THE DRAWINGS

FIG. 1 is a perspective view of the hitch of the present invention.

FIG. 2 is a side view of the hitch as connected to the implement and to the tractor.

FIG. 3 is an exploded perspective view showing the male plug and the female shell of the hitch.

FIG. 4 is a side sectional view taken along lines 4—4 of FIG. 1.

FIG. 5 is a sectional view taken along lines 5—5 of FIG. 2 and showing the bias means of the coupler, which connects the hitch to the implement, when the longitudinal axis of the hitch is horizontally disposed.

FIG. 6 is a view similar to FIG. 5 showing the bias means when the hitch is pivoted downwardly about a horizontal axis, as indicated by the dotted lines of FIG. 2.

FIG. 7 is a perspective view showing the bias means of the coupler.

FIG. 8 is a sectional view taken along lines 8—8 of FIG. 4.

FIG. 9 is a sectional view taken along lines 9—9 of FIG. 8, and showing the locking clip in the locked position and the unlocked position.

FIG. 10 is a view taken along lines 10—10 of FIG. 9 and showing the lock release ring in the locked and unlocked positions.

FIG. 11 is an enlarged sectional view taken along lines 11—11 of FIG. 1.

FIG. 12 is a perspective view of the lock release ring.

DETAILED DESCRIPTION OF THE DRAWINGS

The hitch of the present invention is generally designated in the drawings by the reference numeral 10, and is used for connecting an implement to a tractor. The hitch basically includes a male plug 12 and a female shell 14 which are matingly coupled together. The male plug 12 is connected to the tractor, and the female shell 14 is connected to the implement as described below.

Male plug 12 has a forward end 16, a rearward end 18, and an exterior side wall extending therebetween. The side wall has a first portion 20 extending rearwardly from forward end 16 and a second portion 22 tapering to rearward end 18 from first portion 20. Accordingly, rearward end 18 has a smaller cross-sectional area than forward end 16. While the forward and rearward ends of male plug 12 are shown to be somewhat eliptical in cross-section, it is understood that they may take other shapes without departing from the scope of the present invention.

Male plug 12 further includes a pair of ears 24 on the top side of first side wall portion 20 and a pair of stub shafts 26 extending outwardly on opposite sides of first side wall portion 20. Ears 24 and stub shafts 26 are adapted to receive the connecting arms 28 and 30, respectively, of the tractor's three point hitch, as shown in FIG. 2. A pair of hydraulic cylinders 32 are connected to arms 30 of the three point hitch in a conventional manner, as shown in FIG. 2, for raising and lowering the three point hitch.

Male plug 12 also has a shaft 34 rotatably mounted in bearings 36, as best seen in FIG. 4. Shaft 34 has a forward end extending forwardly from male plug 12 to which a yoke 38 is attached. In turn, yoke 38 is connected to the power take-off 40 of the tractor in any conventional manner. The rearward end of shaft 34 is hollow.

Male plug 12 further includes hydraulic fluid passages 42 bored therein, as best seen in FIGS. 4 and 11. A quick connect 44 is threadably secured to the forward end of passages 42 and provides for a quick connection of the male plug to the hydraulic system of the tractor, via hydraulic lines 45, as seen in FIG. 2. The rearward end of passages 42 include an enlarged diameter portion 46 and a beveled extremity 48 on the rearward end 18 of male plug 12, as best seen in FIG. 11.

Female shell 14 includes a forward end 50, a rearward end 52, and a side wall having a first portion 54 extending rearwardly from forward end 50 and a second portion 56 tapering to rearward end 52 from first portion 54. Forward end 50 is open while rearward end 52 is closed, such that the side wall of female shell 14 has an exterior surface and an interior surface. Female shell 14 is complementarily shaped to male plug 12 and is adapted to matingly receive male plug 12, as best seen in FIG. 4. The top side of first side wall portion 54 has a recess 58 therein for receiving ears 24 of male plug 12. The opposite sides of side wall portion 54 also have recesses 60 therein for receiving stub shafts 26 on male plug 12, as best seen in FIGS. 1 and 3.

Female shell 14 has a shaft 62 extending through rearward end 52 thereof, as best seen in FIG. 4. Shaft 62 is rotatably supported by bearings 64. A yoke 66 is attached to the rearward end of shaft 64 and is also attached to a conventional telescoping drive member 68, which in turn is connected to the drive train 70 of the implement, a shown in FIG. 2.

The forward end of shaft 62 is matingly received within the hollow rearward end of shaft 34 when the male plug 12 is matingly received within female shell 14, as shown in FIG. 4. The forward end of shaft 62 and the rearward end of shaft 34 may be beveled to facilitate the entry of shaft 62 into shaft 34. Thus, when the male plug and female shell are coupled together, the power take-off of the tractor will impart rotation to shaft 34, shaft 62, telescoping drive members 68 and thereby drive train 70 of the implement such that the implement drive train is powered by the power take-off of the tractor. Also, as represented by dashed lines in FIG. 4, as male plug 12 is being inserted into female shell 14, shaft 62 is automatically aligned with shaft 34 prior to actual engagement therebetween, due to the initial mating engagement of first side wall portion 20 of male plug 12 with first side wall portion 54 of female shell 14.

The female shell also includes a hydraulic fluid passage 72 extending through the rearward end thereof, as best seen in FIG. 11. A nipple 74 is threadably received in passage 72 and extends forwardly therefrom so as to be received within the enlarged diameter portion 46 of passage 42 in male plug 12. O-rings 76 provide a seal with passage 42. A quick connect 78 is also threadably received within passage 72 and extends rearwardly therefrom for connection to the hydraulic system of the implement by hydraulic lines 80, as seen in FIG. 2. Thus, when male plug 12 is matingly received within female shell 14, the hydraulic system of the tractor is connected to the hydraulic system of the implement via hydraulic lines 45, quick connects 44 on male plug 12, fluid passages 42 in plug 12, nipples 74 on female shell 14, fluid passages 72 in female shell 14, quick connects 78 on shell 14, and hydraulic lines 80.

The female shell 14 is attached to the implement by a coupler 82 which permits substantially universal pivotal movement of hitch 10 with respect to the implement. Coupler 82 includes a pair of spaced apart ears 84 fixed to female shell 14 and extending downwardly therefrom. A second pair of ears 86 which are interconnected by a pair of plates 88 are pivotally connected to the first pair of ears 84 by a horizontally disposed pin 90 which extends through ears 84 and plates 88. Ears 86 extend rearwardly from ears 84. A tongue 92 extending forwardly from the implement is received between plates 86 and is secured to ears 86 by a vertically disposed pin 94 which extends through corresponding holes 96 in ears 86, as best seen in FIG. 2. Coupler 82 allows hitch 10 to pivot in a vertical plane about pin 90 and in a horizontal plane about pin 94 so that the tractor and implement can turn and travel over uneven ground. In the absence of hitch 10, tongue 92 of the implement is connected to a tongue 98 extending rearwardly from the tractor in any conventional manner.

When male plug 12 is disengaged from female shell 14, there is a tendency for female shell 14 to pivot downwardly about pin 90 due to the weight of the shell. Therefore, a bias means 100 is provided in coupler 82 so as to maintain the longitudinal axis of female shell 14 in a substantially horizontal position, such that the shell is in a position to receive male plug 12. Bias means 100 is shown in FIGS. 5–7.

More particularly, the bias means includes a first cam 102 which extends through one of plates 88 and is fixed to the adjacent ear 84. A tortional spring 104 has one end operatively attached to the opposite plate 88 and an opposite end attached to a second cam 106. As shown in the drawings, the first end of spring 104 is attached to a bearing 108 which in turn is attached to plate 88. Horizontal pin 90 extends through first cam 102, second cam 106, tortional spring 104, and bearing 108 so as to provide a sliding guide for second cam 106.

When the longitudinal axis of female shell 14 is substantially horizontally disposed, cams 102 and 106 matingly engage one another, as shown in FIG. 5. When the longitudinal axis of the shell moves away from the horizonal, for example, when the tractor and implement are traveling over uneven ground whereby hitch 10 pivots about pin 90, as shown by dotted lines in FIG. 2, cam 102 rotates with respect to cam 106 such that the cam surfaces engage one another in a non-mating manner, as shown in FIG. 6. Spring 104 normally urges the cams into mating engagement, such that the longitudinal axis of female shell 14 is maintained in the horizontal position when gravity is the only force acting on the shell.

Hitch 10 is also provided with a locking and unlocking mechanism which allows the male plug 12 to be releasably locked to female shell 14. This mechanism is shown in FIGS. 8–10.

More particularly, female shell 14 includes a plurality of retainers 110 projecting radially outwardly from the side wall thereof. Retainer 110 includes a front beveled cam surface 112 and a rearwardly facing shoulder 114, as best seen in FIG. 9. Male plug 12 includes an L-shapesd clip which is pivotally mounted adjacent forward end 16 thereof. Clip 116 includes an arm 120 and an innerconnected leg 122. Arm 120 has a rear beveled cam surface 124 and a forwardly disposed lip 126. A spring 128 normally urges clip 116 into a locking position, as shown by solid lines in FIG. 9.

As male plug 12 is moved rearwardly for receipt into female shell 14, cam surface 124 of arm 120 engages cam surface 112 of retainer 110, such that clip 116 is pivoted out of the locking position and thereby allowing the clip to move over the retainer. When male plug 12 is matingly received within female shell 14, spring 128 urges lip 126 into overlapping engagement with shoulder 114 so that the male plug is locked in position within female shell 14.

A release ring 130 is rotatably mounted within the forward end 16 of male plug 12. Ring 130 includes a recessed portion 132 and a cam surface 134. A plurality of teeth 136 mesh with the teeth of a gear 134 which is operatively connected to an electric motor 140 which is also mounted within male plug 12.

When clip 116 is in the locked position, leg 122 engages recessed portion 132 of release ring 130. In order to move clip 116 to an unlocked position, as shown in dotted lines in FIG. 9, wherein lip 126 is disengaged from shoulder 114 of retainer 110, motor 140 is actuated to rotate release ring 130, whereby leg 122 engages cam surface 134 of the release ring. As the rotation of the release ring continues, cam surface 134 pushes leg 122 of clip 116 rearwardly into a recess 142 within plug 12 and thereby releases lip 126 from engagement with shoulder 114. This movement of release ring 140 and leg 122 is represented by dotted lines in FIG. 10. After male plug 12 is disengaged from female shell 14, motor 140 can be actuated to rotate release ring 130 in the opposite direction, whereby leg 122 moves back into engagement with the recessed portion 132 of the ring under bias from spring 128. Thus, plug 12 is ready to be re-attached to shell 14.

In preparation for connecting the implement to the tractor, male plug 12 is attached to the tractor as described above. More particularly, the three point hitch of the tractor is connected to ears 24 and stub shafts 26 of male plug 12, the power take-off 40 of the tractor is attached to shaft 34 of the plug by yoke 38, and the hydraulic system of the tractor is connected to quick connects 44 on the plug by hydraulic lines 45.

Female shell 14 is connected to the implement as described above. More particularly, tongue 92 of the implement is secured to ears 86 of coupler 82 by pin 94. The drive train 70 of the implement is connected to shaft 62 of the female shell via telescoping drive member 68 and yoke 66. The hydraulic system of the implement is connected to quick connects 78 of the shell by hydraulic lines 80.

These preparatory connections of the male plug to the tractor and the female plug to the implement may be permanent such that the tractor and implement are always ready to be attached to one another. To connect the tractor and implement, the tractor is simply backed up towards the implement such that plug 12 is inserted into shell 14. Bias means 100 of coupler 82 assures that shell 14 is in a position to receive plug 12. Tapered side wall portion 22 of male plug 12 facilitates the alignment of the plug with the shell. Furthermore, the initial engagement of first side wall portion 20 of plug 12 with first side wall portion 52 of shell 14 assures the alignment of shaft 62 of the female shell with the hollow end of shaft 34 of the male plug. As the rearward movement of the tractor continues, cam surface 124 of clip 116 engages cam surface 112 of retainer 110 such that the clip is pivoted clockwise, as shown by dotted lines in FIG. 9, until the male plug is completely inserted within the female shell and lip 126 of locking clip 116 overlaps shoulder 114 of retainer 110 and is urged into retentive engagement therewith by spring 128. Thus, male plug 16 is locked into engagement with female shell 14, the power take-off of the tractor is operatively connected to the drive train of the implement, and the hydraulic system of the tractor is operatively connected to the hydraulic system of the implement. All of these connections are made automatically while the operator remains seated on the tractor.

To disengage male plug 12 from female shell 14, motor 140 is actuated to rotate release ring 130 such that cam surface 134 of the release ring moves leg 122 of the locking clip 116 into the recess 142 within male plug 12. Thus, lip 126 of clip 116 is pivoted out of engagement with shoulder 114 of retainer 110. Then, the tractor can be moved forwardly away from the implement such that male plug 12 is removed from female shell 14. Motor 140 can then be actuated to rotate release ring 130 in the opposite direction such that clip 116 is pivoted under the bias of spring 128 to its normal locking position and whereby male plug 12 is ready to be re-attached to female shell 14. This disconnection of the plug from the shell is performed while the operator remains seated on the tractor.

From the foregoing, it can be seen that the present invention accomplishes at least all of the stated objectives.

What is claimed is:

1. A hitch device for connecting an implement to a tractor, said tractor having a power take-off, a three point hitch, and a primary hydraulic system, said implement having a drive shaft and a secondary hydraulic system, said device comprising:

a male plug operatively connected to the three point hitch of said tractor and having a forward end, rearward end, an exterior side wall with a first portion extending rearwardly from said forward end and a second portion tapering to said rearward end from said first portion and such that the rearward end has a smaller cross-sectional area than said forward end, and a longitudinal axis;

a female shell operatively connected to said implement and having an open forward end, a rearward end, an internal sidewall with a first portion extending rearward from said forward end and a second portion tapering to said rearward end from said first portion, and a longitudinal axis;

the sidewalls of the male plug and female shell cooperating to automatically align the axes thereof when the rearward end of said male plug enters the open forward end of said female shell upon rearward movement of said tractor toward said implement, whereby said male plug is matingly received within said female shell;

latch means for automatically locking said male plug and said female shell together when moved into mating engagement with one another; and means for automatically deactuating said latch means so as to unlock said male plug and said female shell for uncoupling.

2. The hitch device of claim 1 further comprising means for connecting the primary hydraulic system of said tractor to the secondary hydraulic system of said implement.

3. The hitch device of claim 2 wherein said female shell includes first hydraulic connect means for connecting said shell to the secondary hydraulic system of said implement, said male plug includes first hydraulic connect means for connecting said male plug to the primary hydraulic system of said tractor, said female shell further including a second hydraulic connect means on the internal rearward end thereof and being in communication with said first hydraulic connect means of said female shell, and said male plug further including a second hydraulic connect means on the rearward end thereof and being in communication with said first hydraulic connect means of said male plug, said second hydraulic connect means of said male plug and of said female shell being adapted to automatically couple together with said male plug is received within said female shell whereby the primary hydraulic system of said tractor is connected to the secondary hydraulic system of said implement.

4. The hitch device of claim 3 wherein said secondary hydraulic connect means of said female shell includes a nipple extending forwardly from the internal rearward end of said shell and said secondary hydraulic connect means of said male plug includes an aperture on the rearward end thereof for matingly and sealingly receiving the nipple of said female shell.

5. The hitch device of claim 4 wherein said aperture has a beveled extremity for guiding the nipple into the aperture.

6. The hitch device of claim 1 further comprising means for coupling the power take-off of said tractor to the drive shaft of said implement.

7. The hitch device of claim 6 wherein said female shell includes a shaft operatively connected to said drive shaft of said implement, said male plug has a shaft operatively connected to said power take-off of said tractor, said shaft of said female shell being automatically connected to said shaft of said male plug when said male plug is received in said female shell.

8. The hitch device of claim 7 wherein the shaft of said female shell has a forward end extending forwardly from the internal rearward wall thereof and the shaft of said male plug has a hollow rearward end for matingly receiving the forward end of said shaft of said female shell.

9. The hitch device of claim 8 wherein at least one of the rearward end of said male plug or the forward end of the shaft of the female shell has a beveled extremity for guiding the forward end of the shaft of the female plug into the hollow rearward end of the shaft of the male plug.

10. The hitch device of claim 1 wherein the latch means includes a clip pivotally mounted on the male plug adjacent the forward end thereof, and a retainer on the female shell adjacent the forward end thereof, said clip being pivotal between a locked position wherein said clip overlappingly engages said retainer to lock said male plug and female shell together and an unlocked position wherein said clip is disengaged from said retainer whereby said male plug and said female shell can be separated from one another.

11. The hitch device of claim 10 wherein said clip includes spring means for normally biasing said clip to said locked position.

12. The hitch device of claim 11 wherein the clip has a retaining arm and a releasing leg, and being pivotally mounted on said male plug intermediate the arm and leg thereof.

13. The hitch device of claim 12 wherein said arm of said clip has a forwardly facing lip for overlappingly and releasably engaging a rearwardly facing shoulder on said retainer when said lip is in said locked position, said lip further having a beveled rearwardly facing cam surface for slidably engaging a beveled forwardly facing cam surface on said retainer and thereby pivoting said arm against the bias of said spring until said lip moves past said shoulder and then into engagement therewith under the bias of said spring.

14. The hitch device of claim 13 wherein said means for deactuating said latch means includes a release ring rotatably mounted on the forward end of said male plug and power means for rotating said ring, said ring having a cam surface engaging said leg of said clip and pivoting said clip against the bias of said spring means when said ring is rotated in one direction so that said lip is released from engagement with said shoulder and thereby unlocking said male plug and said female shell.

15. The hitch device of claim 14 wherein said ring has a plurality of teeth, and said power means includes a motor with a drive shaft and a toothed gear, the teeth of said gear meshing with the teeth of said ring so as to rotate said ring upon actuation of said motor.

16. A hitch device for connecting an implement to a tractor, said tractor having a power take-off, a three point hitch, and a primary hydraulic system, said implement having a drive shaft and a secondary hydraulic system, said device comprising:

a male plug operatively connected to the three point hitch of said tractor and having a forward end, rearward end, an exterior side wall with a first portion extending rearwardly from said forward end and a second portion tapering to said rearward end from said first portion and such that the rearward end has a smaller cross-sectional area than said forward end, and a longitudinal axis;

a female shell operatively connected to said implement and having an open forward end, a rearward end, an internal sidewall with a first portion extending rearward from said forward end and a second portion tapering to said rearward end from said first portion, and a longitudinal axis;

the sidewalls of the male plug and female shell cooperating to automatically align the axes thereof when the rearward end of said male plug enters the open forward end of said female shell upon rearward movement of said tractor toward said implement, whereby said male plug is matingly received within said female shell;

means for locking and unlocking said male plug and said female shell;

a coupler for connecting said female shell to said implement and for allowing substantially universal movement therebetween; and bias means for maintaining the longitudinal axis of said female shell in a horizontally disposed position when said male plug is disengaged from said female shell.

17. The hitch device of claim 16 wherein said coupler includes a first pair of ears rigidly attached to said female shell and extending downwardly therefrom, a second pair of ears pivotally connected to said first pair of ears and extending rearwardly therefrom, a first horizontally disposed pin for pivotally connecting said first and second pairs of ears and thereby allowing relative movement therebetween about a horizontal axis, and a second vertically disposed pin pivotally connecting said second pair of ears to a tongue extending forwardly from said implement and thereby allowing relative movement therebetween about a vertical axis.

18. The hitch device of claim 16 wherein said bias means includes a first cam secured to one of said first pair of ears, a second cam engaging said first cam, a torsional spring having one end fixed to said second cam and a second end operatively fixed to one of said second pair of ears, said first horizontally disposed pin extending through said first and second cams and through said torsional spring, said first cam being pivotally movable with respect to said second cam between a mating engagement position when the longitudinal axis of said female shell is longitudinally disposed and a non-mating engagement position when said female shell pivots about said horizontally disposed pin, said spring normally urging said cams into said mating engagement position whereby the longitudinal axis of said female shell is biased to a horizontal position.

19. The hitch device of claim 16 further comprising means for connecting the primary hydraulic system of said tractor to the secondary hydraulic system of said implement.

20. The hitch device of claim 19 wherein said female shell includes first hydraulic connect means for connecting said shell to the secondary hydraulic system of said implement, said male plug includes first hydraulic connect means for connecting said male plug to the primary hydraulic system of said tractor, said female shell further including a second hydraulic connect means on the internal rearward end thereof and being in communication with said first hydraulic connect means of said female shell, and said male plug further including a second hydraulic connect means on the rearward end thereof and being in communication with said first hydraulic connect means of said male plug, said second hydraulic connect means of said male plug and of said female shell being adapted to automatically couple together when said male plug is received within said female shell whereby the primary hydraulic system of said tractor is connected to the secondary hydraulic system of said implement.

21. The hitch device of claim 20 wherein said secondary hydraulic connect means of said female shell includes a nipple extending forwardly from the internal rearward end of said shell and said secondary hydraulic connect means of said male plug includes an aperture on the rearward end thereof for matingly and sealingly receiving the nipple of said female shell.

22. The hitch device of claim 21 wherein said aperture has a beveled extremity for guiding the nipple into the aperture.

23. The hitch device of claim 16 further comprising means for coupling the power take-off of said tractor to the drive shaft of said implement.

24. The hitch device of claim 23 wherein said female shell includes a shaft operatively connected to said drive shaft of said implement, said male plug has a shaft operatively connected to said power take-off of said tractor, said shaft of said female shell being automatically connected to said shaft of said male plug when said male plug is received in said female shell.

25. The hitch device of claim 24 wherein the shaft of said female shell has a forward end extending forwardly from the internal rearward wall thereof and the shaft of said male plug has a hollow rearward end for matingly receiving the forward end of said shaft of said female shell.

26. The hitch device of claim 25 wherein at least one of the rearward end of said male plug or the forward end of the shaft of the female shell has a beveled extremity for guiding the forward end of the shaft of the female shell into the hollow rearward end of the shaft of the male plug.

* * * * *